(12) United States Patent
Boon

(10) Patent No.: US 11,252,040 B2
(45) Date of Patent: Feb. 15, 2022

(54) ADVANCED NETWORK TRACING IN THE DATA PLANE

(71) Applicant: Cisco Technology, Inc., San Jose, CA (US)

(72) Inventor: Gary Kenneth Boon, Manotick (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 228 days.

(21) Appl. No.: 16/050,856

(22) Filed: Jul. 31, 2018

(65) Prior Publication Data

US 2020/0044931 A1 Feb. 6, 2020

(51) Int. Cl.
*H04L 12/24* (2006.01)
*H04L 12/26* (2006.01)
*H04L 29/06* (2006.01)
*H04L 12/723* (2013.01)

(52) U.S. Cl.
CPC .......... *H04L 41/12* (2013.01); *H04L 41/046* (2013.01); *H04L 43/10* (2013.01); *H04L 45/50* (2013.01); *H04L 63/101* (2013.01)

(58) Field of Classification Search
CPC ....... H04L 41/12; H04L 41/046; H04L 43/10; H04L 45/50; H04L 63/101
USPC ........................................................ 709/224
See application file for complete search history.

(56) References Cited

U.S. PATENT DOCUMENTS

| | | | |
|---|---|---|---|
| 4,236,068 A | 11/1980 | Walton | |
| 5,642,303 A | 6/1997 | Small et al. | |
| 5,751,223 A | 5/1998 | Turner | |
| 6,282,701 B1 * | 8/2001 | Wygodny | G06F 11/3466 702/183 |
| 6,812,824 B1 | 11/2004 | Goldinger et al. | |
| 7,275,104 B1 * | 9/2007 | Martinez | H04L 41/069 709/218 |
| D552,603 S | 10/2007 | Tierney | |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS

Fd.io, VPP/What is VPP?, May 26, 2017 (Year: 2017).*

(Continued)

*Primary Examiner* — Schquita D Goodwin
(74) *Attorney, Agent, or Firm* — Polsinelli PC

(57) ABSTRACT

Systems and methods provide advanced network tracing techniques in the data plane. A data plane packet processing system can receive a request to trace a class of network traffic. The system can receive a plurality of packets. The system can determine on a per packet basis whether to trace the plurality of packets. The system can mark a trace flag associated with a first packet in response to determining that the first packets corresponds to the class of network traffic. The system can capture a trace entry for the first packet in response to determining that the tracing flag has been marked. The trace entry can be configured to include or exclude a packet count, a packet header, a packet payload, and/or processing information. In addition, the trace buffer for storing trace entries can be configurable (e.g., fixed-size buffer, circular buffer, or dynamic buffer).

20 Claims, 8 Drawing Sheets

(56) References Cited

U.S. PATENT DOCUMENTS

| | | | |
|---|---|---|---|
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,446,899 B2 | 5/2013 | Lei et al. | |
| 8,458,184 B2 | 6/2013 | Dorogusker et al. | |
| D691,636 S | 10/2013 | Bunton | |
| 8,549,638 B2 | 10/2013 | Aziz | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,686,881 B1* | 4/2014 | Harnik | H03M 7/6064 341/51 |
| 8,693,367 B2 | 4/2014 | Chowdhury et al. | |
| 8,718,644 B2 | 5/2014 | Thomas et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| D757,424 S | 5/2016 | Phillips et al. | |
| D759,639 S | 6/2016 | Moon et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| D776,634 S | 1/2017 | Lee et al. | |
| 9,544,337 B2 | 1/2017 | Eswara et al. | |
| 9,609,504 B2 | 3/2017 | Karlqvist et al. | |
| 9,642,167 B1 | 5/2017 | Snyder et al. | |
| 9,654,344 B2 | 5/2017 | Chan et al. | |
| 9,713,114 B2 | 7/2017 | Yu | |
| 9,772,927 B2 | 9/2017 | Gounares et al. | |
| 9,820,105 B2 | 11/2017 | Snyder et al. | |
| D804,450 S | 12/2017 | Speil et al. | |
| 9,858,559 B2 | 1/2018 | Raleigh et al. | |
| 9,860,151 B2 | 1/2018 | Ganichev et al. | |
| 9,933,224 B2 | 2/2018 | Dumitriu et al. | |
| 9,923,780 B2 | 3/2018 | Rao et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 10,145,956 B2* | 12/2018 | Modica | G01C 21/005 |
| 10,284,460 B1* | 5/2019 | Bshara | H04L 43/0817 |
| 10,516,626 B1* | 12/2019 | Kodeboyina | H04L 45/74 |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0220358 A1* | 9/2007 | Goodill | H04L 1/22 714/43 |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2008/0316922 A1 | 12/2008 | Riddle et al. | |
| 2009/0129389 A1 | 5/2009 | Halna DeFretay et al. | |
| 2009/0161547 A1* | 6/2009 | Riddle | H04L 69/161 370/236 |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0166637 A1* | 6/2012 | White, Jr. | H04L 63/1425 709/224 |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0233460 A1 | 8/2014 | Pettus et al. | |
| 2014/0269321 A1 | 9/2014 | Kamble et al. | |
| 2014/0301213 A1* | 10/2014 | Khanal | H04L 43/04 370/248 |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2014/0351415 A1* | 11/2014 | Harrigan | H04L 43/045 709/224 |
| 2015/0016286 A1 | 1/2015 | Ganichev et al. | |
| 2015/0016469 A1 | 1/2015 | Ganichev et al. | |
| 2015/0030024 A1 | 1/2015 | Venkataswami et al. | |
| 2015/0043581 A1 | 2/2015 | Devireddy et al. | |
| 2015/0063166 A1 | 3/2015 | Sif et al. | |
| 2015/0065161 A1 | 3/2015 | Ganesh et al. | |
| 2015/0087330 A1 | 3/2015 | Prechner et al. | |
| 2015/0103679 A1* | 4/2015 | Tessmer | H04L 43/50 370/252 |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |

(56) References Cited

U.S. PATENT DOCUMENTS

| | | | |
|---|---|---|---|
| 2015/0222510 | A1 | 8/2015 | Vaidya et al. |
| 2015/0223337 | A1 | 8/2015 | Steinmacher-Burow |
| 2015/0256972 | A1 | 9/2015 | Markhovsky et al. |
| 2015/0264519 | A1 | 9/2015 | Mirzaei et al. |
| 2015/0280827 | A1 | 10/2015 | Adiletta et al. |
| 2015/0288410 | A1 | 10/2015 | Adiletta et al. |
| 2015/0326704 | A1 | 11/2015 | Ko et al. |
| 2015/0358777 | A1 | 12/2015 | Gupta |
| 2015/0362581 | A1 | 12/2015 | Friedman et al. |
| 2016/0007315 | A1 | 1/2016 | Lundgreen et al. |
| 2016/0044627 | A1 | 2/2016 | Aggarwal et al. |
| 2016/0099847 | A1 | 4/2016 | Melander et al. |
| 2016/0105408 | A1 | 4/2016 | Cooper et al. |
| 2016/0127875 | A1 | 5/2016 | Zampini, II |
| 2016/0146495 | A1 | 5/2016 | Malve et al. |
| 2016/0277299 | A1* | 9/2016 | Kadaba ............... H04L 41/142 |
| 2016/0344641 | A1 | 11/2016 | Javidi et al. |
| 2017/0026974 | A1 | 1/2017 | Dey et al. |
| 2017/0093986 | A1 | 3/2017 | Kim et al. |
| 2017/0180235 | A1 | 6/2017 | Zak et al. |
| 2017/0208011 | A1* | 7/2017 | Bosch ................. H04L 47/25 |
| 2017/0214551 | A1 | 7/2017 | Chan et al. |
| 2018/0019931 | A1* | 1/2018 | Jalan ................... H04L 43/028 |
| 2018/0041470 | A1* | 2/2018 | Schultz ................ H04L 47/24 |
| 2018/0069311 | A1 | 3/2018 | Pallas et al. |
| 2018/0084389 | A1 | 3/2018 | Snyder et al. |
| 2018/0124183 | A1* | 5/2018 | Kozat ................... H04L 67/125 |
| 2018/0145904 | A1* | 5/2018 | Alleman ............. H04L 47/2483 |
| 2020/0019335 | A1* | 1/2020 | Tamborski ............ H04L 41/06 |
| 2020/0314694 | A1* | 10/2020 | Yu ........................ H04L 49/70 |

FOREIGN PATENT DOCUMENTS

| | | |
|---|---|---|
| WO | WO 2016/036627 | 3/2016 |
| WO | WO 2018/009340 | 1/2018 |

OTHER PUBLICATIONS

Wikipedia, VPP/What is VPP?, 2017 (Year: 2017).*
John DeNisco, Vector Packet Processor Documentation Release 0.1, Jul. 20, 2018 (Year: 2018).*
Wikipedia, vpp-dev@lists.fd.io (/g/vpp-dev), May 14, 2018 (Year: 2018).*
Asumu Takikawa, How to Develop VPP Plugins, Mar. 22, 2018 (Year: 2018).*
International Telecommunication Union, ITU-T Focus Group IMT-2020 Deliverables, 2017, p. 167, URL retrieved via: https://www.itu.int/en/publications/Documents/tsb/2017-IMT2020-deliverables/files/basic-html/page167.html (Year: 2017).*
"I Love WiFi, The difference between L2 and L3 Roaming Events," Apr. 1, 2010, 6 pages.
Afolabi, Ibrahim, et al., "Network Slicing & Softwarization: A Survey on Principles, Enabling Technologies & Solutions," Mar. 21, 2018, pp. 1-24.
Antonioli, Roberto, et al., "Dual Connectivity for LTE-NR Cellular Networks," Research Gate, Sep. 3-6, 2017, pp. 171-175.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cisco ASR 5x00 Mobility Management Entity Administration Guide, Version 15.0, Last updated Jun. 13, 2014, Cisco, 1-266.
Cisco Systems, Inc., "Wi-Fi Location-Based Services 4.1 Design Guide," May 20, 2008, 206 pages.
Cox, Jacob H. Jr., et al., "Advancing Software-Defined Networks: A Survey," IEEE, Oct. 12, 2017, pp. 25487-25526.
Cui, Wenzhi et al., "DIFS: Distributed Flow Scheduling for Data Center Networks," Nanjing University, China, Jul. 28, 2013, 10 pages.
Galvan T., Carlos E., et al., "Wifi bluetooth based combined positioning algorithm," International Meeting of Electrical Engineering Research ENIINVIE 2012, Procedia Engineering 35 (2012), pp. 101-108.
Geller, Michael, et al. , "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Network Heresy, "NVGRE, VXLAN and What Microsoft is Doing Right," Oct. 3, 2011, 5 pages.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
International Search Report and Written Opinion from the International Searching Authority, dated Feb. 5, 2019, 12 pages, for corresponding International Patent Application No. PCT/US2018/046127.
"Cisco IOS Embedded Packet Capture Command Reference," Cisco Systems, Inc., Jan. 22, 2018, 48 pages.
"Packet Trace," Cisco ASR 1000 Series Aggregation Services Routers Software Configuration Guide, Aug. 3, 2016, 12 pages.
Denisco, John, "Vector Packet Processor Documentation, Release 0.1," 126 pages.
Sadreameli, Jalal E., "FD.io—Vector Packet Processing—One Terabit Software Router on Intel® Xeon® Scalable Processor Family Server," Jul. 12, 2017, 21 pages.

* cited by examiner

| Command | Purpose |
|---|---|
| `adt dashboard [<thread>]` | Query tracing state / configuration |
| `adt monitor all` | Trace all known ports |
| `adt monitor port [ethernet ｜ meh] <port>` | Trace single port |
| `adt monitor acl <acl>` | Trace packets corresponding to ACL |
| `adt monitor feature-arc <feature-arc>` | Trace packets traversing a VPP feature arc |
| `adt monitor thread <thread>` | Trace thread/core |
| `adt monitor node <nodeName> <packetCount>` | Trace VPP graph node |
| ... | |
| `adt monitor disable [all] [ports] [nodes] [acl] [feature-arc] [threads ｜ <thread>]` | Turn off all/some monitors |
| `adt start [<thread>]` | Start tracing |
| `adt stop [<thread>]` | Stop tracing |
| `adt clear [<thread>]` | Clear trace buffer |
| `adt list [{<thread> ｜ merge}] [<verbosity>] [pcap]` | Summary of traces |
| `adt packet N {<thread> ｜ merge } [<verbosity>] [pcap]` | Detail of a single packet |
| `adt config buffer [<thread>] fixed N ｜ circular N ｜ dynamic` | Configure trace buffer of fixed size N, circular size N, or dynamic size |
| `adt config technique [<thread>] count ｜ packet ｜ expert` | Configure trace technique to count packets, capture packet data only (e.g., headers or full packets), or capture expert data (per-node traces and packet data) |
| `adt config packet [<thread>] off ｜ header ｜ full` | Configure trace to turn off packet capture, capture packet header only, or capture full packet |

FIG. 2

ADVANCED NETWORK TRACING IN THE DATA PLANE

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The subject matter of this disclosure relates in general to the field of computer networks, and more specifically to advanced network tracing techniques in the data plane.

BACKGROUND

A network can be divided into two primary areas of functionality—a control plane and a data plane. The control plane can carry signaling data and be responsible for routing traffic. The data plane (sometimes also referred to as the forwarding plane, user plane, carrier plane, or bearer plane) can be responsible for pushing packets and carrying user traffic. As an example, the data plane can comprise parts of the network that process packets and look up forwarding tables to forward data. The control plane can include elements that populate the forwarding tables.

A well-designed data plane optimizes packet forwarding performance. As a result, computing resources implementing the data plane are devoted almost exclusively to pushing packets as quickly possible, and debugging and packet tracing can often be an after-thought. Capturing traffic and packet metadata at modern data rates in the data plane can thus be a tremendous challenge because of the constraints on processing and memory bandwidth.

BRIEF DESCRIPTION OF THE FIGURES

To provide a more complete understanding of the present disclosure and features and advantages thereof, reference is made to the following description, taken in conjunction with the accompanying drawings, in which:

FIG. 2 illustrates an example of a command line interface for tracing a data plane packet processor in accordance with an embodiment;

DESCRIPTION OF EXAMPLE EMBODIMENTS

Figure 1:
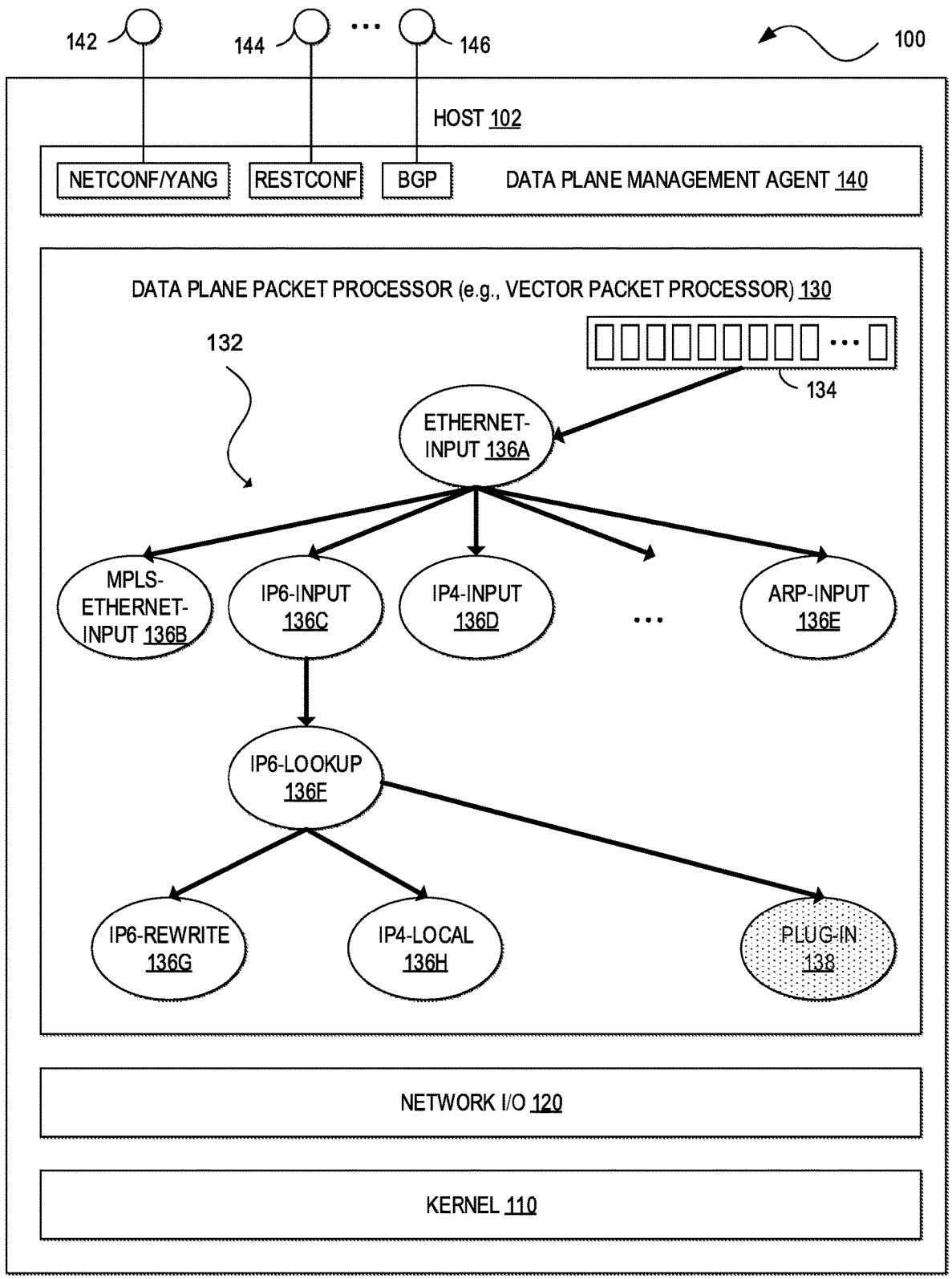
FIG. 1 illustrates an example of a data plane packet processing system in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide advanced network tracing techniques in the data plane. A data plane packet processing system can receive a request to trace a class of network traffic. The packet processing system can receive a plurality of packets. The packet processing system can determine on a per packet basis whether to trace each packet of the plurality of packets. The packet processing system can mark a trace flag associated with a first packet of the plurality of packets in response to determining that the first packets corresponds to the class of network traffic. The packet processing system can capture a trace entry for the first packet in response to determining that the tracing flag of the first packet has been marked. The trace entry can be configured to include or exclude a packet count, a packet header, a packet payload, and/or processing information. In addition, the trace buffer for storing trace entries can be configurable (e.g., fixed-size buffer, circular buffer, or dynamic buffer).

Example Embodiments

As discussed above, the data plane can be a harsh environment to debug. The data plane is designed to maximize packet forwarding performance leaving scarce computing resources remaining for other tasks. As a result, debugging and packet tracing can be challenge in terms of capture, data storage, and retrieval. In addition, current implementations of data plane packet tracing (referred to herein as native data plane tracing or native tracing) suffer from many limitations. For example, some types of native data plane tracing may be limited to tracing a fixed number of packets at a single location within the processing pipeline. This can make it difficult to analyze network traffic along dimensions more familiar to network operators and users (e.g., traffic to/from certain ports or interfaces, network addresses, Virtual Local Area Networks (VLANs), etc.; traffic of a certain protocol; traffic having certain header values or flags; exception traffic; etc.). Another limitation of some native data plane tracing systems is that the trace data captured can be very specific—full processing data at a single point in the processing pipeline and minimal packet information. This can be both too much data that unnecessarily incurs a performance hit and not enough data relevant for the purposes of network operators and users. In addition, certain types of native data plane tracing may also rely on unlimited trace buffers. This can have severe consequences for a network if tracing is configured improperly and/or not monitored. Various embodiments of the present technology can overcome these and other deficiencies of the prior art by enabling data plane tracing based on the type or class of network traffic (e.g., characteristics of the traffic itself instead of limiting tracing to a single point in the packet processing pipeline). An Advanced Data plane Tracing (ADT) system can also support a number of different ways to configure network tracing, such as different trace buffer options (e.g., fixed-size buffers or circular buffers); tracing techniques (e.g., packet count, packet capture, or packet capture and capture of graph node processing information); types of packet data captured (e.g., no packet data, packet header only, or full packet); and types of output (e.g., single-line or multi-line, each with multiple levels of verbosity).

FIG. 1 illustrates an example of a data plane packet processing system 100. One of ordinary skill in the art will understand that, for the data plane packet processing system 100 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not necessarily depart from the scope of the present disclosure.

The data plane packet processing system 100 can reside within a host 102. The host 102 can be a physical or bare-metal server (e.g., x86, Advanced Reduced Instruction Set (RISC or R) Machine (ARM), PowerPC, etc.), a virtual machine (VM), or a container. The host 102 can include a kernel 110, a network input/output (I/O) layer 120, a data plane packet processor 130, and a data plane management agent 140. The kernel 110 is the core component of an operating system and can provide basic services for other parts of the operating system; it is the part of the operating system that may load first, and remain in main memory of the host 102. The kernel 110 can be responsible for memory management, process and task management, and disk management. The kernel 110 can connect the system hardware (physical or virtual) to the application software. Some examples of a kernel include variants of the Berkeley Software Distribution (BSD) (e.g., FreeBSD, NetBSD, OpenBSD, etc.), Linux kernel, and Windows NT® kernel.

In this example, the data plane packet processor 130 can implement Vector Packet Processing (VPP). The VPP platform is a highly extensible framework for providing switch and router functionality. It is the open source version of Cisco Systems®, Inc.'s VPP technology—a high performance packet-processing stack that can run on commodity or general purpose CPUs. The VPP platform defines a set of nodes in a directed graph called a packet processing graph. Individual nodes of the graph can apply a specific network function to packets, and edges can identify the next network function for additional handling of the packets. Instead of processing one packet at a time, a VPP can collect multiple packets into a frame (or vector), and pass the frame to the next node specified by the directed edge of the packet processing graph. The next node can receive the packets, process them based on the functionality it provides, and transmit the frame to the next node. This can repeat until the last node of the graph outputs the frame onto a network interface. When a frame is handled by a node, the CPU may only need to load the instruction cache (I-cache) for processing the first packet of the frame. The remaining packets can benefit from the instructions already in the I-cache. In addition, while the node processes one packet, the CPU can pre-fetch the next packet of the frame into data cache (D-cache). The VPP platform also supports plugins for introducing new processing nodes and rearranging the packet processing graph.

Although the data plane packet processor 130 is a VPP in this example, other embodiments may implement the present technology in other types of data plane packet processing platforms, including hardware routers/switches, frameworks that use general-purpose CPUs and off-load some or all packet processing to other hardware (e.g., Network Processing Units (NPUs), Field Programmable Gate Array (FPGAs), or Graphics Processing Units (GPUs)), and/or other frameworks that may only use general-purpose CPUs (e.g., the Click Modular Router, the Data Plane Development Kit (DPDK), Netmap, NetSlices, or PF_RING).

The network I/O layer 120 can abstract the networking devices (e.g., physical or virtual network interface controller (NIC)) of the host 102 to provide networking functionality to higher level software layers (e.g., the data plane packet processor 130). In some embodiments, the DPDK may be used to implement the network I/O layer 120. The DPDK is a set of data plane libraries and network interface controller (NIC) drivers for fast packet processing that is managed as an open source project by the Linux Foundation. DPDK's library functions can improve network I/O performance through efficient memory handing by using a ring-buffer for transferring packets back and forth between the physical NIC and higher level layers. To reduce the number of CPU interrupts that are required for packet reads, the DPDK may use periodic polling. If the packet rate decreases to very low values, the DPDK can switch to interrupt mode. Other examples of network I/O processing frameworks include Netmap, PF_RING, and Snabb Switch.

The data plane packet processor 130 comprises a set of nodes 136A, 136B, 136C . . . 136N (collectively, "136") in a directed graph 132 called the packet processing graph. Each node 136 can represent a particular network function to apply to a set of packets. For example, node 136A is an Ethernet input node, node 136B is a Multiprotocol Label Switching (MPLS)-Ethernet input node, node 136C is an Internet Protocol version 6 (IPv6) input node, node 136D is an IPv4 input node, node 136E is an Address Resolution Protocol (ARP) input node, node 136F is an IPv6 lookup node, node 136G is an IPv6-rewrite node, and node 136H is an IPv4 local processing node. The data plane packet processor 130 also supports customization of the packet processing graph 132 through a plugin 138 that can introduce one or more new processing nodes, rearrange the packet processing graph 132, or define one or more new low-level API functions.

At runtime, the data plane packet processor 130 can read available packets from the network I/O layer 120 to form a vector of packets 134. The data plane packet processor 130 can process the vector of packets 134 through the packet processing graph 132. Rather than process the first packet through the whole graph, and then the second packet through the whole graph, the data plane packet processor 130 can process the entire vector of packets 134 through a graph node (e.g., node 136A) before moving onto the next graph node (e.g., node 136C). During processing, the first packet in the vector 134 can "warm" up the I-cache. The remaining packets in the vector 134 can be processed without thrashing occurring in the I-cache. The fixed costs of processing the vector of packets 134 are thus amortized across the entire vector. In addition, the data plane packet processor 130 can mitigate read latency by pre-fetching the next packet of the vector 134 into the D-cache.

In addition to higher performance achieved through vector processing and pre-fetching, the data plane packet processor 130 can also provide statistically reliable performance. For example, if the data plane packet processor 130 falls behind processing incoming packets, the next vector processed will contain more packets, and thus the fixed costs can be amortized over a larger number of packets, bringing down the average processing cost per packet, enabling the system to catch up. As a result, throughput and latency can be stable. If multiple cores are available on the host 102, a graph scheduler (not shown) can schedule vector-graph node pairs to different cores.

The graph node architecture of the data plane packet processor 130 can also make for easy extensibility. The data plane packet processor 130 provides support for incorporating an independent binary plugin (e.g., plugin 138) from a separate source code base. At runtime, the data plane packet processor 130 can load plugins from the plugin directory. This allows new features to be introduced via plugin without needing to change the core infrastructure code. This same graph node architecture can also support hard acceleration. A hardware accelerator vendor can replace a software graph node with a plugin that acts as an input node for performing hardware acceleration that can then hand off to software graph node, or the hardware accelerator vendor can add an output node for performing hardware acceleration which is handed off to as soon as software processing is finished. In this manner, accelerating hardware can be used if present but network processing carp continue if the hardware is missing or its resources are exhausted.

The data plane management agent 140 provides one or more interfaces between the host 102 and other network nodes. These interfaces can implement Network Configuration Protocol (NETCONF)/Yet Another Next Generation (YANG) 142, Representational State Transfer (REST) CONF 144, or Border Gateway Protocol (BGP) 146, among others. YANG is a data modeling language for the definition of data sent over NETCONF. YANG can be used to model both configuration data as well as state data of network nodes. YANG can also be used to define the format of event notifications generated by the network and to define the signature of remote procedure calls that can be invoked on the network nodes via NETCONF. YANG is protocol independent and can be converted into any encoding format (e.g., Extensible Mark-Up Language (XML), Javascript Object Notation (JSON), etc.) supported by the network configuration protocol. RESTCONF 144 is a REST-like protocol running over Hypertext Transfer Protocol (HTTP) for accessing data defined in YANG using data stores defined in NETCONF.

As discussed, current data plane packet processors can provide rudimentary native network tracing functionality that suffers from various limitations. For example, native VPP tracing is limited to tracing by processing graph node. Other data plane tracing solutions may only provide sampling-based measurement tools impaired by low measurement accuracy and coarse-grained measurement. There may be no way in the VPP platform or other data plane packet processing frameworks to trace based on the type or class of network traffic (e.g., traffic to/from certain ports or interfaces, source and/or destination addresses and/or port numbers, VLANS, MPLS labels, etc.; traffic transmitted over a specified network protocol; or other characteristics or qualities of traffic). There are also issues with the trace data captured by native tracing tools. For example, the VPP platform may only natively provide graph node processing data and minimal packet details. This can represent both too much data that negatively affects performance and not enough data that is particularly pertinent to network operators and users. Native tracing solutions may also rely on unlimited trace buffers, which can be dangerous in a field environment. An Advanced Data plane Tracing (ADT) system can overcome these and other deficiencies of the prior art.

FIG. 2 illustrates an example of a command line interface (CLI) 200 for tracing network traffic flowing through an Advanced Data plane Tracing (ADT) system. One of ordinary skill in the art will appreciate that the CLI 200 is one possible implementation for providing the features discussed in the present disclosure. Other embodiments may include fewer commands, more commands, and/or different commands. Still other embodiments may utilize other types of user interfaces, such as a graphical user interface (GUI) (e.g., standalone application or web-based application, an application programming interface (API) (e.g., NETCONF, REST API, etc.), or other interface without departing from the scope of the present disclosure. The CLI 200 is provided for simplicity and conciseness but one of ordinary skill in the art will appreciate the features and functions discussed herein are widely applicable to other types of interfaces.

Unlike some types of native data plane tracing, the ADT system can support packet tracing by traffic type or class, such as network traffic associated with a particular port or interface. In some embodiments, the ADT system can provide this functionality using monitors. A monitor can operate as a probe which enables the ADT system to capture a particular set of packets. The ADT system can use different kinds of monitors/probes to identify the set of packets having particular characteristics. For instance, a port monitor (e.g., adt monitor all or adt monitor port) can be used to select capture of traffic on a particular port. Here, for example, the CLI 200 can include a command 202 to trace all known ports (e.g., adt monitor all) and a command 204 to trace a specific port (e.g., adt monitor port).

An Access Control List (ACL) can be a rule or set of rules for identifying a certain type or class of traffic. An ACL can specify a set of conditions that a packet must satisfy to match the rule(s). For example, an ACL can identify a traffic type or class by the traffic's port or interface (e.g., Ethernet interface, Ethernet port-channel interface, proprietary headers, etc.); VLAN; source and/or destination address (e.g., IPv4 or IPv6 address, Media Access Control (MAC) address, etc.) and/or port numbers; protocol (e.g., ICMP (Internet Control Message Protocol), Internet Group Management Protocol (IGMP), IPv4, IPv6, Transmission Control Protocol (TCP), User Datagram Protocol (UDP), Stream Control Transmission Protocol (SCTP), Address Resolution Protocol (ARP), Layer Two Tunneling Protocol (L2TP), etc.); MPLS label; or timestamp (on Receive (RX) and/or Transmit (TX)); among other types or classes of network traffic. An ACL can also identify a traffic type or class using other packet fields (e.g., ICMP types and codes, IGMP types, IP Precedence level, IP Differentiated Services Code Point (DSCP) value, TCP packets with the ACK, FIN, PSH, RST, SYN, or URG bit set). An ACL monitor can enable configuration of network tracing by the particular protocol fields that are of interest for a particular monitor/probe, identify the set of packets based on matching criteria for specified protocol fields, and so forth. In some embodiments, the CLI 200 can include a command 206 to trace a type or class of traffic corresponding to an ACL (e.g., adt monitor acl).

The CLI 200 of the ADT system can also include a command 208 to trace traffic processed by a particular VPP feature arc. Feature arcs comprise ordered sets of graph nodes for steering packets along a specific path of the VPP processing graph. Some examples of VPP feature arcs include device-input, ethernet-output, interface-output, ip4-drop, ip4-local, ip4-multicast, ip4-output, ip4-punt, ip4-unicast, ip6-drop, ip6-local, ip6-multicast, ip6-output, ip6-punt, ip6-unicast, mpls-input, mpls-output, and nsh-output.

Each feature node in an arc is independently controlled. In addition, feature arc nodes are generally unaware of each other. As an example, the ip4-unicast feature arc comprises features such as nat64-out2in-handoff, nat64-out2in, nat44-ed-hairpin-dst, nat44-hairpin-dst, ip4-dhcp-client-detect, nat44-out2in-fast, nat44-in2out-fast, nat44-handoff-classify, nat44-out2in-worker-handoff, nat44-in2out-worker-handoff, nat44-ed-classify, nat44-ed-out2in, nat44-ed-in2out, nat44-det-classify, nat44-det-out2in, nat44-det-in2out, nat44-classify, nat44-out2in, nat44-in2out, ip4-qos-record, ip4-vxlan-gpe-bypass, ip4-reassembly-feature, ip4-not-enabled, ip4-source-and-port-range-check-rx, ip4-flow-classify, ip4-inacl, ip4-source-check-via-rx, ip4-source-check-via-any, ip4-policer-classify, ipsec-input-ip4, vpath-input-ip4, ip4-vxlan-bypass, and ip4-lookup, among others.

The CLI 200 of the ADT system can also include a command 208 to trace traffic processed by a specified VPP graph node. Native VPP tracing may be limited to this approach. In some embodiments, the ADT system can introduce network tracing by type of class of traffic (e.g., port, ACL, feature-arc, etc.) but continue to support native tracing methods, such as tracing by VPP graph node.

The CLI 200 of the ADT system can also include a command 210 to trace a specific thread or core, a subset of threads/cores, or all threads/cores of a host of the ADT system. In some embodiments, the ADT system can output packet traces on a per thread/core basis or merge/combine traces of packets processed by multiple threads/cores. For example, the ADT system can either output all of the packets processed by a particular thread/core or output all of the traces for a packet together even when the packet is processed by distinct threads/cores.

In some embodiments, the CLI 200 can provide more fine-tuned control over network tracing. For example, the CLI 200 may include a command 214 to disable or deactivate tracing by type or class of traffic (e.g., adt monitor disable [ports] [acl]) or by VPP graph node (e.g., adt monitor disable [nodes]) or set of VPP graph nodes (e.g., adt monitor disable [feature-arc]). The CLI may also include a command 216 to begin tracing if not yet initiated or to restart tracing if paused (e.g., adt start), a command 218 to pause tracing (e.g., adt stop), and a command 220 to clear the buffers for storing trace data (e.g., adt clear). Hence, various embodiments of the present disclosure can give network operators and users greater control over tracing.

In some embodiments, the ADT system can output trace data along multiple dimensions of verbosity, such as single-line output across numerous levels of brevity or verbosity and multi-line output across similar or different degrees of brevity or verbosity. The ADT system can also output data for a single packet or multiple packets, as well as a packet or packets within a single thread/core or a combined list of a single packet or set of packets across multiple threads/cores. In addition, the ADT system can output trace data in Packet Capture (PCAP) format for consumption by offline or external tools. For example, the CLI 200 may provide a command 222 for outputting a single-line summary of traces with multiple levels of brevity or verbosity (e.g., minimum output, summary output, detailed output, expert output, maximum output, etc.) and a command 224 for outputting a multi-line summary of a trace with multiple levels of brevity or verbosity (which can be the same or different levels as the command 212).

The CLI 200 of the ADT system can also include a number of commands to configure tracing, which are not possible with native tracing. These tracing configurations may include a command 226 to specify the total amount of trace data to capture and the manner of storing the trace data, such as to trace using a fixed size buffer, circular buffer, or dynamic buffer. In a fixed size trace buffer, the size of the trace buffer can be specified and tracing can be terminated when the buffer is filled. In a circular buffer, the size of the buffer (e.g., 4096 packets) can be specified and tracing can "wrap" around (e.g., overwrite the oldest trace data) when the buffer is filled. In a dynamic buffer, the buffer can grow indefinitely but the ADT system can include a mechanism to terminate tracing when resources are exhausted.

The tracing configurations may also include a command 228 to specify a tracing technique or manner of capturing trace data, such as to limit capture to packet counts only or capture of packet data only (e.g., headers or full packets), or to enable expert capture (e.g., capture of graph node processing information and packet details). The CLI 200 of the ADT system can also include a command 230 to configure the amount of trace data to capture on a per packet basis (e.g., no packet data, packet headers only, or full packets).

Figure 3:
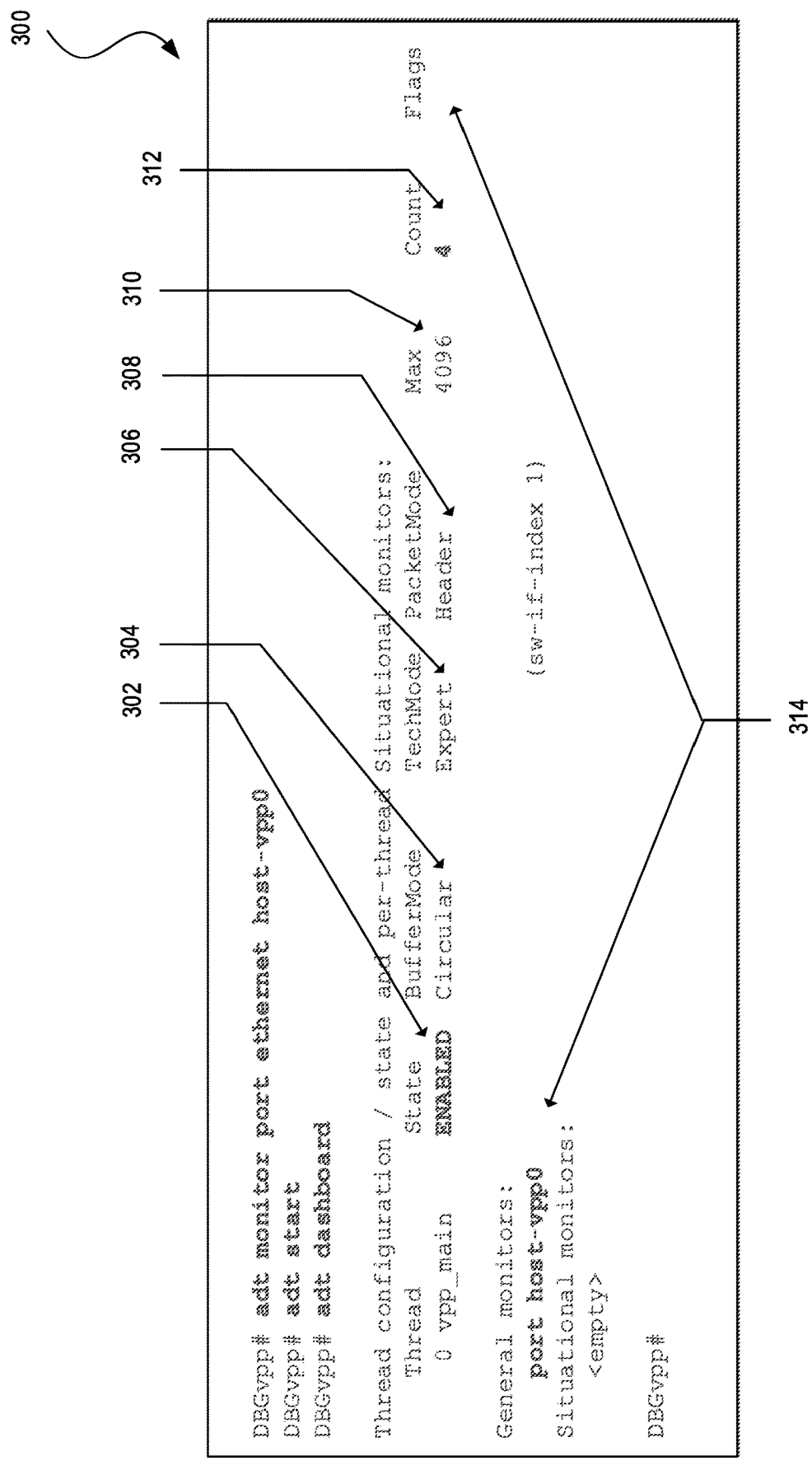
FIG. 3 illustrates an example of an output of a command line interface for displaying a network tracing state of a data plane packet processor in accordance with an embodiment.
Figure 4:
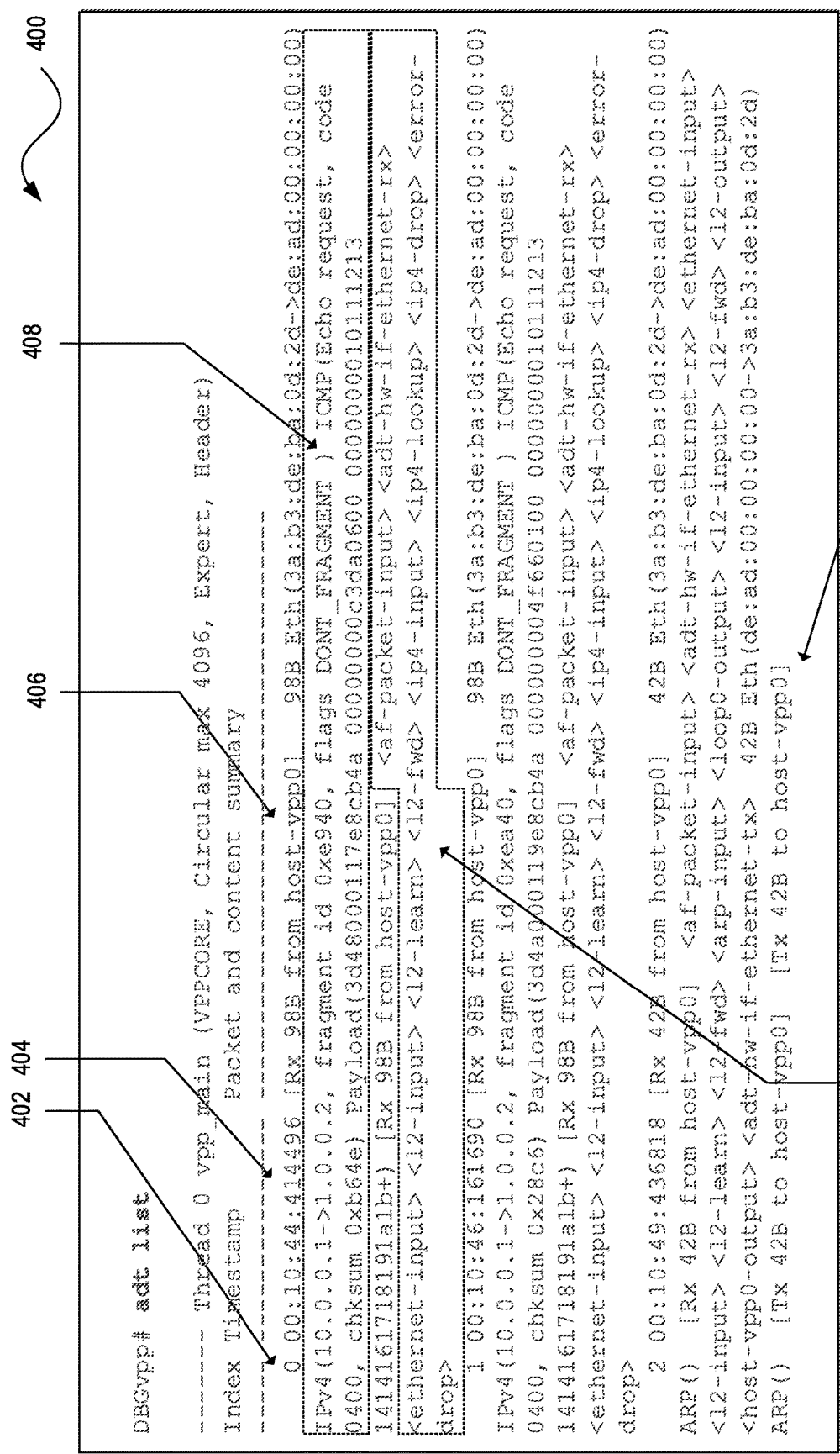
FIG. 4 illustrates an example of an output of a command line interface for displaying a single-line network trace of a data plane packet processor in accordance with an embodiment.
Figure 5:
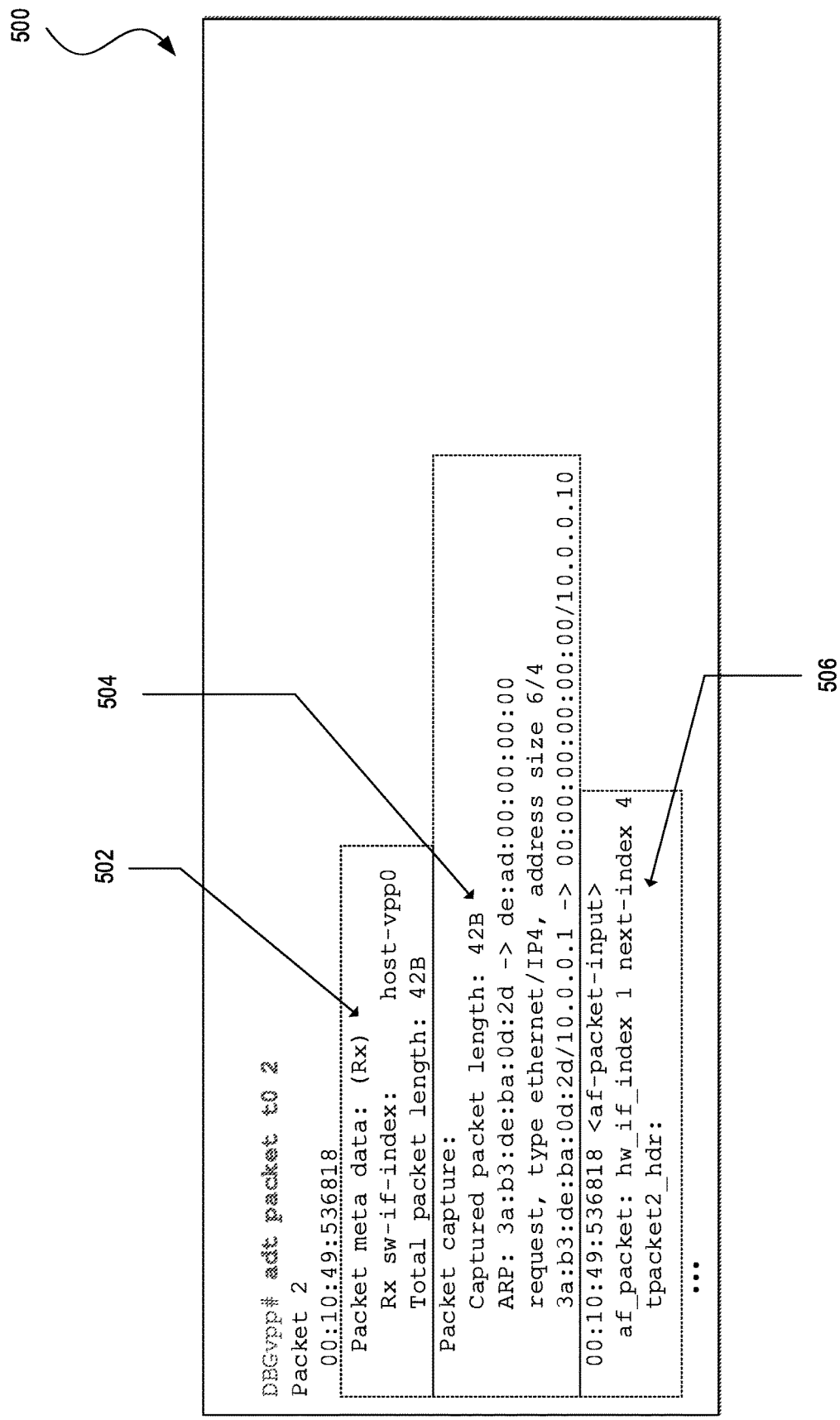
FIG. 5 illustrates an example of an output of a command line interface for displaying a multi-line network trace of a data plane packet processor in accordance with an embodiment.

FIGS. 3, 4, and 5 illustrate examples of outputs from the CLI 200 of the ADT system. In particular, FIG. 3 illustrates an example of an output 300 from a command to monitor Ethernet port host-vpp0 (e.g., adt monitor port Ethernet host-vpp0), start the adt system tracing (e.g., adt start), and to display the tracing state/configuration (e.g., adt dashboard). The output 300 includes a monitoring state 302 of the main thread (e.g., Enabled), a buffer mode 304 (e.g., Circular), a technique mode 306 (e.g., Expert), a packet mode 308 (e.g., Header), a maximum buffer size 310 (e.g., 4096 packets), a packet count 312 (e.g., 4 packets captured), and configured monitors 314 (e.g., General monitors and Situational monitors).

In some embodiments, the ADT system can be integrated with native tracing. For example, the ADT system can support native tracing as one type of monitoring and store trace data in native trace buffers. Periodically, the ADT system can move trace data in the native trace buffers to the ADT system's trace buffers and output native tracing data alongside the ADT system's trace data. In this manner, the ADT system can provide tracing that is backwards-compatible. Thus, users already familiar with native tracing can obtain such trace data as well as obtain additional trace data only available from the ADT system. General monitors can be monitors that work with both the ADT system and native tracing. For example, general monitors can enable tracing of a particular VPP graph node. Situational monitors can be monitors only available through the ADT system. For instance, situational monitors can enable tracing of specific types or classes of traffic (e.g., ports, VLANs, MPLS labels, ACLs, etc.).

FIG. 4 illustrates an example of an output 400 from a command for single-line display (e.g., adt list) of a network trace by the ADT system. The output 400 can provide a summary of each packet captured by the trace, including a packet index 402; an RX timestamp 404; RX information 406, including the amount of packet data captured (e.g., 98B) and the RX port (e.g., host-vpp0); a packet header summary 408; a list of the nodes 410 of the packet processing graph traversed by the packet (e.g., af-packet-input, ADT-hw-if-ethernet-rx, ethernet-input, 12-input, 12-learn, 12-fwd, ip4-input, ip4-lookup, ip4-drop, error-drop); and TX information 412, including the amount of packet data transmitted (e.g., 42B) and the TX port (e.g., host-vpp0).

FIG. 5 illustrates an example of an output 500 from a command for multi-line display (e.g., adt packet t0 2) of a network trace by the ADT system. The multi-line output 500 can display trace data in a format that is easier for a user to read (e.g., RX information 502) and additional information not included in single-line display (e.g., packet header information 504 or graph node processing information 506). For example, the graph node processing information 506 can include packet processing details rather than simply list the graph node traversed by the packet.

Figure 6:
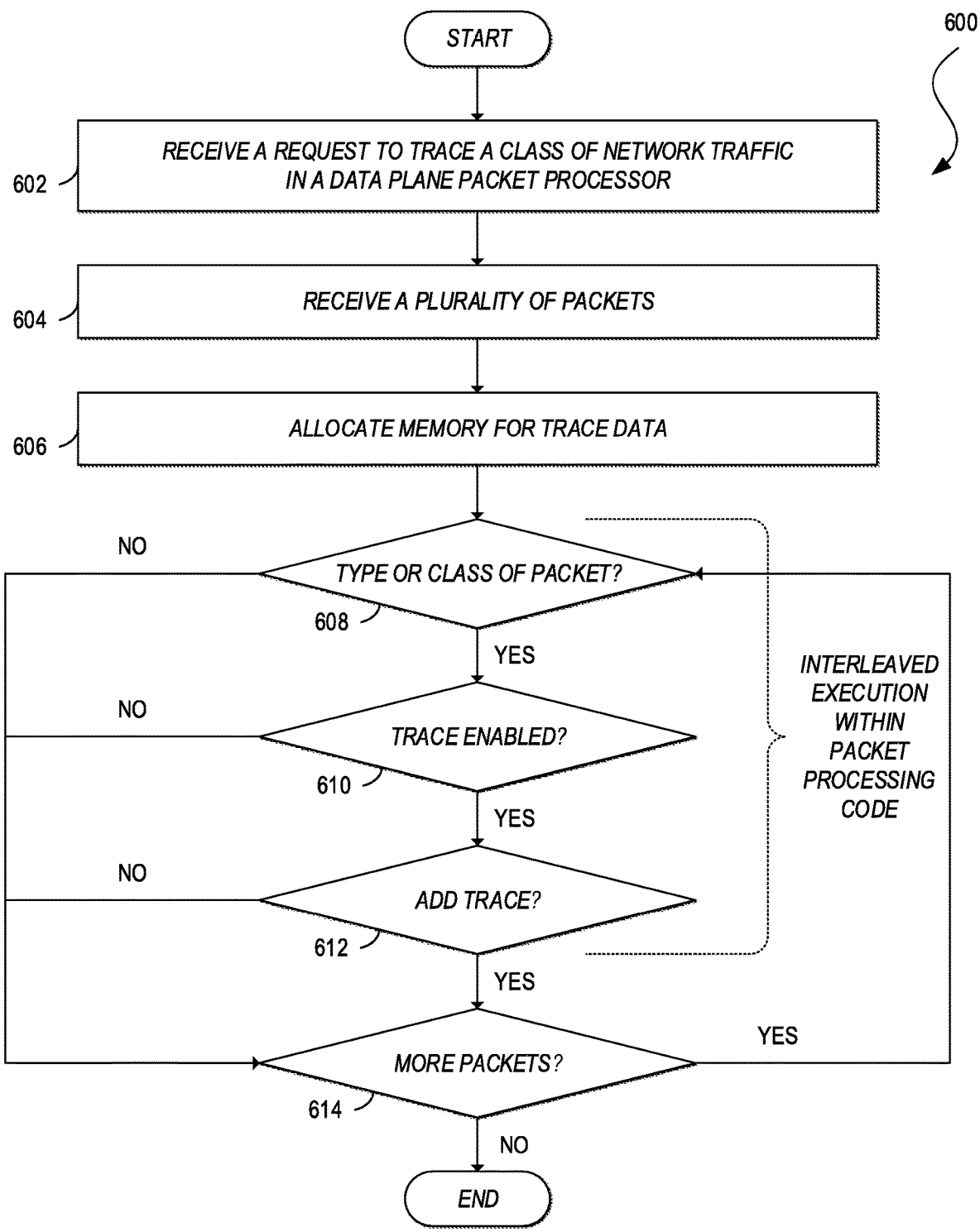
FIG. 6 illustrates an example of a process for network tracing of a data plane packet processor in accordance with an embodiment.

FIG. 6 illustrates an example of a process 600 for tracing network traffic flowing through a data plane packet processor. One of ordinary skill will understood that, for any processes discussed herein, there can be additional, fewer, or alternative steps performed in similar or alternative orders, or in parallel, within the scope of the various embodiments unless otherwise stated. In this example, the process 600 may begin at step 602 in which the system receives a request to trace a type or class of network traffic in a data plane packet processor (e.g., the data plane packet processor 130). The type or class of the traffic may be determined based on a source port of the traffic, a VLAN associated with the traffic, whether the traffic matches an ACL rule (e.g., a source or destination address and/or port numbers, network protocol, MPLS label, timestamp, or other packet header data), or other characteristics or qualities of the traffic.

In addition, the system can configure tracing according to a number of different options. The system may have a default tracing configuration but can update the tracing configuration upon request. For example, a requestor can select a type of buffer to use for tracing, such as a fixed size buffer, a circular buffer, or a dynamic buffer. In addition, the requestor can select a trace technique, such as to capture packet counts only, capture packet data (e.g., headers or full packets) only, or capture packet data and processing data. The requestor can also configure how much information to capture on a per packet basis, including turning off packet capture, capturing packet header only, or capturing a full packet.

The process 600 can continue to step 604 in which the system can receive a plurality of packets (e.g., packet vector 134) from a Receive (Rx) ring (e.g., network I/O layer 120). At step 606, the system can allocate memory for storing trace data. This can include allocating memory for each thread/core involved with packet processing (e.g., buffer pool), trace metadata for each packet, and a trace buffer for each packet.

Figure 7:
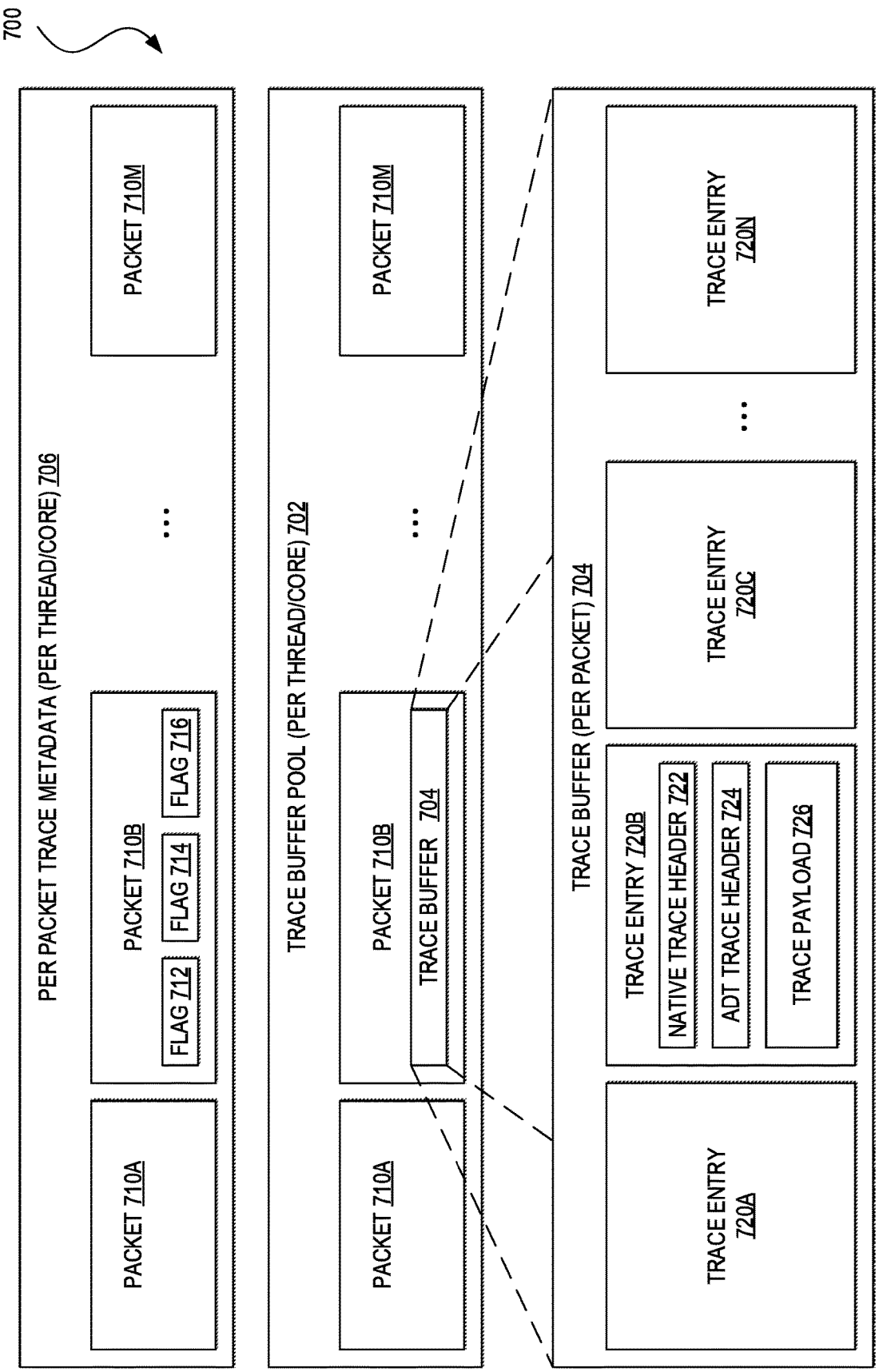
FIG. 7 illustrates an example of a trace buffer system for a data plane packet processor in accordance with an embodiment.

FIG. 7 illustrates an example of a trace buffer system 700 for an ADT system. The trace buffer system 700 can comprise a trace buffer pool 702 per thread or CPU core performing packet processing. For example, a host having a quad-core CPU using four threads/cores for packet processing can allocate a trace buffer pool for each core, and thus the host may allocate four trace buffer pools from memory. The trace buffer pool 702 can include a trace buffer 704 per packet in the system for each packet enabled for tracing. In this example, the ADT system includes packets 710A, 710B, 710C, . . . , and 710M (collectively, "710"). If all of these packets are enabled for tracing, the trace buffer pool 702 may comprise M trace buffers 704.

The trace buffer system 700 can also include per packet trace metadata 706 for maintaining per packet trace state as packets traverse the network. The ADT system can maintain this data structure in parallel to the trace buffer pool on a per thread/core basis. The number of elements of the per trace metadata 706 can be equal to the number of packets in the system. For example, if there are M packets for the trace buffer pool 706, there can also be M packet trace metadata instances for the trace buffer pool 706. Each packet trace metadata instance in the ADT system can include a flag 712 for indicating whether native tracing is enabled, a flag 714 for indicating whether ADT tracing is enabled, a flag 716 indicating whether the packet header has been captured, and other packet trace metadata (e.g., source port, packet length, thread/core, etc.) (not shown). In some embodiments, the packet trace metadata 706 may exist outside of the native tracing domain but inside the packet processing domain.

Each trace buffer 704 can comprise one or more trace entries. In this example, the trace buffer 704 may include trace entries 720A, 720B, 720C, . . . , and 720N (collectively, "720"). The trace buffer 704 can thus comprise N trace entries. Each trace entry 720 can include a native trace header 722, an ADT trace header 724, and a trace payload 726. The native trace header 722 can comprise a timestamp, a node index identifying the processing graph node that generated the trace, and a trace byte size. The ADT trace header 724 can comprise a trace length, a trace type, and additional metadata captured during tracing.

In this example, the ADT system may inherit the trace buffer pool 702, the trace buffer 704, the native trace enabled flag 712, and the native trace header 722 from native tracing. Other elements of the trace buffer system 700 may be specific to ADT. For example, the per packet trace metadata 706, the ADT tracing enabled flag 714, the header captured flag 716, other packet trace metadata, and the ADT trace header 724 may be new data and data structures for supporting ADT Table 1 sets forth an example of an implementation for an ADT trace buffer system. The ADT trace buffer system (e.g., adt_trace_buffer_system) can comprise a set of buffer pools (e.g., adt_trace_buffer_pool) for each core/thread operating in the host of the ADT system. Each buffer pool can comprise a set of trace buffers (e.g., packet_trace) per packet. For each packet, the ADT buffer system can capture the packet's source port, length, data, a flag indicating whether native tracing is enabled (e.g., flag:is_native_tracing_enabled), a flag indicating whether ADT is enabled (e.g., flag:is_adt_tracing_enabled), and a flag indicating whether the packet header has been captured (e.g., flag:is_header_captured).

TABLE 1

Example Data Structures and Pseudo-Code for an ADT Trace Buffer System

| Data Structure | Purpose |
| --- | --- |
| struct { | |
| trace_length; | Length of tracing contents, including the header |

TABLE 1-continued

Example Data Structures and Pseudo-Code for an ADT Trace Buffer System

| Data Structure | Purpose |
| --- | --- |
| trace_type; | Used for classifying the content |
| } adt_trace_entry_header_t; | This is the basic part of a trace entry for a packet. There can be many of these for each packet in the system, one for each piece of data captured for the packet. Trace header followed by trace entry data. |
| struct { | |
| trace_buffer_index; | Index of the trace buffer allocated for the packet |
| current_cpu_core; | Index of the thread/core processing the packet |
| trace_entries [m]; | Set of trace entries for the packet. Each trace entry can include native trace header (e.g., vlib_trace_header_t), adt_trace_entry_header t, and trace payload |
| } packet_trace; | Trace buffer (per packet) |
| struct { | |
| packet_trace[n]; | Set of packet trace buffers allocated per ADT config (per thread/core) |
| } adt_trace_buffer_pool | |
| adt_trace_buffer_pool adt_trace_buffer_system[n]; | Set of cores/threads operating in the system, and associated data |
| struct { | |
| source_port; | Source port |
| packet_length; | Packet length |
| packet_data; | Bytes of the packet |
| flag:is_native_tracing_enabled; | Boolean indicating native tracing is enabled |
| flag:is_adt_tracing_enabled; | Boolean indicating ADT tracing is enabled |
| flag:is_header_captured; | Boolean indicating packet header has been captured |
| } per_packet_metadata | |

Returning now to FIG. 6, the process 600 can continue to conditional logic 608 in which the ADT system can determine, on a per packet basis and inline with the data plane packet processing code, whether to trace a packet depending on its type or class (e.g., whether the type or class of the packet matches the type or class of traffic specified for tracing at step 602). For example, the data plane processor may be a VPP and the data plane packet processing code may be the instruction set for a graph node. The packet processing instructions can incorporate an inline stub for determining on a per packet basis whether to trace a packet, such as whether the packet corresponds to the traffic class requested for tracing in step 602. The stub can comprise simple logic for setting trace flags stored in per-packet metadata or opaque packet data fields for making the tracing decision. As an example, an ACL or next-hop result may be associated with a trace flag that can be set to ultimately cause the packet to be traced. If the conditional logic 608 indicates the type or class of traffic of the packet matches the type or class of traffic specified at step 602, the process 600 may proceed to conditional logic 610. Otherwise, the process 600 may continue to conditional logic 614.

At the conditional logic 610, the ADT system can make a decision whether to trace the packet. This can be a lower-level decision embedded with the inline stub of the conditional logic 608. For example, the tracing decision can involve checking whether certain of the packet's trace flags have been set (e.g., native tracing enabled flag, ADT tracing enabled flag, etc.). If the packet is not enabled for tracing, the process 600 may continue to the conditional logic 614.

If the packet is enabled for tracing, the process 600 can proceed to conditional logic 612 in which the ADT system determines whether to capture a trace entry depending on the configuration for tracing. For example, the conditional logic 612 can include instructions for screening the type of trace entry being requested against the trace configuration. If the trace entry is allowed to proceed, the adt_trace_entry_header_t can describe the type of content captured for the trace entry. In some embodiments, the conditional logic 612 may be embedded at several points in the packet processing code such that multiple trace entries may be captured per graph node or other segment of a packet processing pipeline.

The conditional logic 614 determines whether any packets remain. If no packets remain, the process 600 can conclude. On the other hand, if packets remain, the process 600 can loop back to step 608.

Table 2 sets forth an example of an implementation for an ADT system to capture a trace entry. Table 2 provides an example of an inline function for initiating tracing of a packet (e.g., adt_trace_this_packet) and helper function for allocating memory for a trace buffer and managing the trace buffer (e.g., helper_adt_allocate_trace_buffer), and an inline function for capturing a trace entry (e.g., adt_add_trace) and helper function to allocate a new trace entry for a packet (e.g., helper_function_for_adt_add_trace). Table 3 sets forth an example implementation for integrating the functions set forth in Table 2 inline with packet processing instructions.

TABLE 2

Example API and Pseudo-Code for Advanced VPP Tracing

| Function | Purpose |
|---|---|
| ```
struct }
  adt_trace_entry_header_t contents_header;
  // Custom trace data
  int source_port;
  int packet_length;
  int captured_length;
  int how_to_interpret_this_packet;
  (packet data) // Block of memory for holding packet
    data
} header_or_full_packet_trace;
void adt_trace_this_packet (per_packet_metadata
  *this_packet,
  int expected_header_at_this_point_in_code) {

// First determine whether tracing is allowed on the
  // current core or processing element. This can be a
  // function of the configuration and tracing state
  // (e.g., tracing state may be impacted by memory
  // resources on the core). For example, if memory
  // resources are exhausted, then tracing may have
  // been automatically disabled on the core, despite
  // having been (previously) enabled.
  if (ADT allowed on this cpu core) {
    if (neither native tracing nor ADT tracing are
      already enabled for this packet) {
      // Allocate new trace buffer for packet
      helper_adt_allocate_trace_buffer(this packet);
    }
    if (this_packet->is_header_captured not set) {
      if (packet_mode configuration allows capture of
        header or packet content) {
        if (technique mode configuration allows capture
          of packet or header content) {
          // Set flag to indicate header has been
          // captured
          this_packet->is_header_captured = 1;
          header_or_full_packet_trace * trace_info;
          trace_info = adt_add_trace (this_packet,
            packet_header_or_full_packet,
            sizeof(header_or_full_packet_trace));
          if (trace_info != 0) {
            // Capture packet metadata (e.g., where
            // it arrived from, packet length, etc.)
            trace_info->source_port = this_pkt_p-
              >source_port;
            trace_info->packet_length =this_pkt_p->
              packet_length;
            // Capture the actual packet data. This
            // may be the full packet or it could be
            // a portion of the packet (e.g.,
            // header), as defined by ADT config
            trace_info->captured length = configured
              amount of packet to capture
            trace_info->packet_data = (copy of packet
              or packet header)
            trace_info->how_to_interpret_this_packet =
              expected_header_at_this_point_in_code
          }
        }
      }
    }
  }
}
void helper_adt_allocate_trace_buffer(per_packet_metadata
  *this_pkt_p) {
  packet_trace *ptrace;
  // Allocate new trace buffer from memory.
  // This reserves some resource to group trace entries
  // for the packet together. The resources are
  // allocated per core/thread for processing
  // efficiency as it may be inefficient to share this
  // content across cores (e.g., cache impact, mutex)
  ptrace = allocate_new_trace_buffer;
  // Allocating memory for the packet can alter the
  // state of the tracing depending on
  // thresholds/memory/etc. For example, if 1000
``` | Trigger to initiate tracing a packet (prior to adding trace entry) |

TABLE 2-continued

Example API and Pseudo-Code for Advanced VPP Tracing

| Function | Purpose |
|---|---|
| ```
  // buffers are allocated per core, and the last of
  // them has been consumed, then turn tracing off on
  // this core. This could impact tracing on the next
  // packet. On the other hand, if using a
  // circular buffer, then "wrap" the buffer index for
  // next packet, so that the next packet's trace
  // overwrites the oldest trace. Another example is
  // when the user has requested a limit on the tracing
  // (e.g., in terms of time, packets, or memory), then
  // turn off tracing.
  manage_trace_buffer;
  this_pkt_p->is_adt_tracing_enabled = 1; // mark this
    packet as traced
  if (packet's current CPU thread different from previous
    CPU thread) {
    // Create trace entry to mark change in thread for
    // output logic to follow tracing across buffers
    // since buffers may be organized by CPU thread.
    // Without this logic, it may not be possible to
    // follow trace entries of a packet across multiple
    // CPU threads. With this logic, it is possible to
    // follow the traces and display a single packet
    // output, rather than multiple outputs (one for
    // each core visited by the packet).
    mark_thread_transition_in_o_d_and_new_threads_for_pa
      cket;
  }
  this_pkt_p->trace_buffer_index = index_of(ptrace,
    cpu_core);
}
void * adt_add_trace(packet_info * this_pkt_p,
  trace_type desired_trace_type,
  int desired_trace_entry_length) {
  void * new_trace_ptr;
  // Adding trace entry depends on type of tracing
  // enabled for packet
  if (native tracing is enabled for this packet) {
    // If native tracing is enabled, use native tracing
    // library to get the trace entry
    new_trace_ptr = vlib_add_trace
      (desired_trace_entry_length)
  }
  else if (ADT enabled for this packet) {

// If ADT is enabled, use ADT to get the trace
    // entry. Note that trace entry may not be allowed
    // depending on ADT configuration and requested
    // trace type
    if (current configuration doesn't allow requested
      desired_trace_type) return 0;
    new_trace_ptr =
      helper_function_for_adt_add_trace(this_pkt_p,
      desired_trace_entry_length);
  } else {
    // no tracing is enabled, so don't create a trace
    // entry
    return 0;
  }
  // Tracing was enabled. Fill in header information.
  adt_trace_entry_header_t * contents_p = new_trace_ptr;
  contents_p->trace length = desired_trace_entry_length;
  contents_p->trace_type = desired_trace_type;
  // Return the pointer to the trace entry
  return new_trace_ptr;
}
``` | Trigger to create a new trace entry for a packet |

TABLE 3

Example Pseudo-Code for Integrating ADT with Native Data Plane Tracing

| Pseudo-Code | Purpose |
|---|---|
| ```
if (some_criteria_for_whether_to_trace_the_packet) {
    adt_trace_this_packet (my_packet,
        my_packet_carries_protocol_ethernet);
  }
}
struct {
  adt_trace_entry_header_t contents_header;
  // custom trace content
  example_data1;
  example_data2 ;
} example_trace_t;

if (ADT or native tracing is enabled for my_packet) {
  // try to add trace entry
  example_trace_t *t;
  t = adt_add_trace (my_packet, adt_direction_none_c,
      sizeof (example_trace_t));
  // if addition of trace entry was successful, capture
  // custom trace data
  if (t != 0) {
    t->example data1 = some_value_to_capture;
    t->example data2 = some_other_value_to_capture;
  }
}
``` | Example usage within a VPP graph node |

Figure 8A:
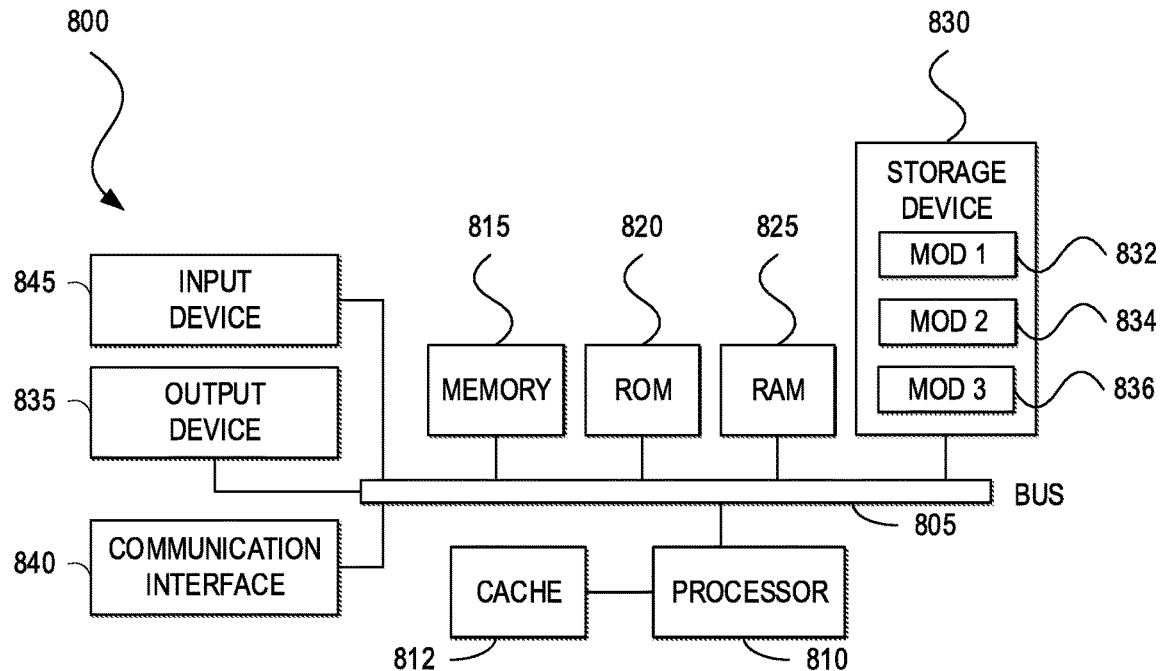
FIGS. 8A and 8B illustrate examples of systems in accordance with some embodiments.
Figure 8B:
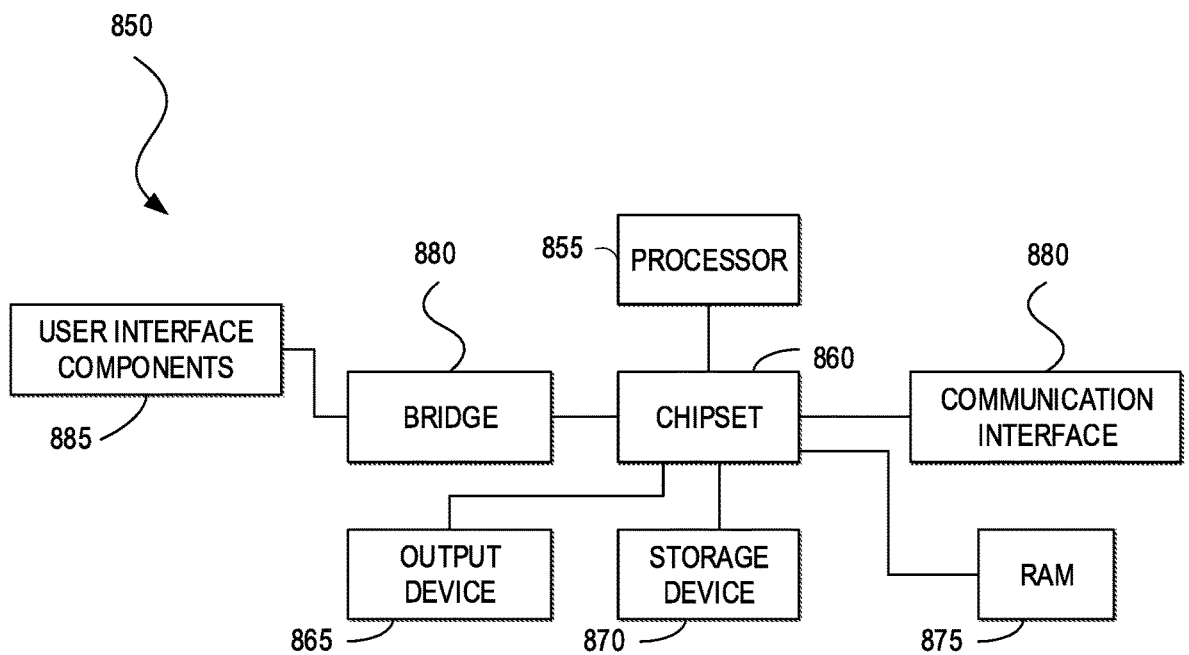

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example architecture for a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a conventional chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving a request to trace a class of network traffic in a data plane packet processor, the data plane packet processor located in a data plane, the request including at least an amount of information to capture on a per packet basis;
   receiving, at the data plane packet processor, a plurality of packets;
   determining, by the data plane packet processor, on a per packet basis whether to trace each packet of the plurality of packets;
   marking, by the data plane packet processor, a tracing flag associated with a first packet of the plurality of packets as enabled, in response to determining that the first packet corresponds to the class of network traffic, wherein when the tracing flag is enabled the first packet is indicated as being traced; and
   capturing, by the data plane packet processor, a trace entry for the first packet in response to determining that the tracing flag of the first packet has been marked as enabled.

2. The method of claim 1, further comprising:
   determining the class of network traffic from a source port of the first packet.

3. The method of claim 1, further comprising:
   determining the class of network traffic from an access control list rule.

4. The method of claim 1, further comprising:
   allocating memory for a trace buffer of a fixed size to store the trace entry; and
   terminating tracing in response to determining that the trace buffer has reached the fixed size.

5. The method of claim 1, further comprising:
   allocating memory for a circular trace buffer to store the trace entry; and
   overwriting a previous trace entry in response to determining that the circular trace buffer has reached a fixed size.

6. The method of claim 1, further comprising:
   receiving a trace configuration request for tracing of at least one of a packet count, a packet header, a full packet, or the full packet and packet processing information; and
   tracing at least one of packet counts, packet headers, full packets, or the full packets and the packet processing information.

7. The method of claim 1, further comprising:
   receiving a trace configuration request setting a verbosity level for outputting the trace entry; and
   outputting the trace entry to an extent corresponding to the verbosity level.

8. The method of claim 1, further comprising:
   outputting a combined set of trace entries for the first packet from multiple threads.

9. The method of claim 1, wherein the data plane packet processor is a vector packet processor (VPP).

10. The method of claim 9, further comprising:
    capturing one or more additional trace entries for the first packet within a VPP graph node.

11. The method of claim 9, wherein computer-executable instructions for determining that the first packet corresponds to the class of network traffic are inline with computer-executable instructions for a VPP graph node.

12. The method of claim 9, further comprising:
    receiving a second request to trace network traffic processed by a VPP feature arc; and
    capturing one or more additional trace entries for one or more packets processed by the VPP feature arc.

13. A data plane packet processor system comprising:
    one or more data plane packet processors in a data plane; and
    at least one computer-readable storage medium having stored therein instructions which, when executed by the one or more data plane packet processors in the data plane, cause the one or more data plane packet processors to:
- receive a request to trace a class of network traffic, the request including at least an amount of information to capture on a per packet basis;
- receive a plurality of packets;
- determine on a per packet basis whether each packet of the plurality of packets corresponds to the class of network traffic;
- mark a tracing flag associated with a first packet of the plurality of packets as enabled, in response to determining that the first packet corresponds to the class of network traffic, wherein when the tracing flag is enabled the first packet is indicated as being traced; and
- capture a trace entry for the first packet in response to determining that the tracing flag of the first packet has been marked as enabled.

14. The system of claim 13, wherein the instructions, when executed by the one or more processors, further cause the one or more processors to:
- determine the class of network traffic from a virtual local area network of the at least one packet.

15. The system of claim 14, wherein the instructions, when executed by the one or more processors, further cause the one or more processors to:
- receive a trace configuration request to exclude tracing of at least one of a packet header, a packet payload, or processing information for a vector packet processing (VPP) graph node; and
- exclude tracing of at least one of packet headers, packet payloads, or processing information for VPP graph nodes.

16. The system of claim 15, wherein the instructions, when executed by the one or more processors, further cause the one or more processors to:
- receive a second request to trace network traffic processed by a VPP feature arc; and
- capture one or more additional trace entries for one or more packets processed by the VPP feature arc.

17. A non-transitory computer-readable storage medium having stored therein instructions which, when executed by one or more data plane packet processors in a data plane of a data plane packet processor system, cause the one or more data plane packet processors to:
- receive a request to trace a class of network traffic in a vector packet processor (VPP), the request including at least an amount of information to capture on a per packet basis;
- receive a vector of packets at a graph node of a set of VPP graphs;
- determine, inline with the graph node, whether each packet of the vector of packets corresponds to the class of network traffic;
- capture a trace entry for at least one packet in response to determining that the at least one packet corresponds to the class of network traffic; and
- in response to determining inline with the graph node for each packet of the vector of packets, receiving the vector of packets at a second graph node of the set of VPP graphs for further determination.

18. The non-transitory computer-readable storage medium of claim 17, wherein the instructions, when executed by the one or more processors, further cause the one or more processors to:
- determine the class of network traffic from at least one of a source address or a destination address of the at least one packet.

19. The non-transitory computer-readable storage medium of claim 17, wherein the instructions, when executed by the one or more processors, further cause the one or more processors to:
- receive a trace configuration request for managing a trace buffer; and
- configure the trace buffer based on the trace configuration request.

20. The non-transitory computer-readable storage medium of claim 17, wherein the instructions, when executed by the one or more processors, further cause the one or more processors to:
- skip tracing of at least one second packet in response to determining that a trace flag of the at least one second packet is not set.

* * * * *